Aug. 9, 1949.  A. TRASK  2,478,343
DIMMING LAMP
Filed Nov. 22, 1944  2 Sheets-Sheet 1

INVENTOR.
Allen Trask
BY
Williamson & Williamson
ATTORNEYS

Aug. 9, 1949.  A. TRASK  2,478,343
DIMMING LAMP
Filed Nov. 22, 1944  2 Sheets-Sheet 2

INVENTOR.
Allen Trask
BY
Williamson & Williamson
ATTORNEYS

Patented Aug. 9, 1949

2,478,343

UNITED STATES PATENT OFFICE 2,478,343

DIMMING LAMP

Allen Trask, Chicago, Ill.

Application November 22, 1944, Serial No. 564,698

3 Claims. (Cl. 315—360)

This invention relates to a method and means for inducing sleep. More particularly it relates to the inducing of sleep by means of a gradual reduction of illumination in a sleeping room in simulation of natural twilight.

Nature's method of inducing relaxation and sleep in the evening is a gradual reduction of light through the setting of the sun. Most species of the animal kingdom respond to this natural method of going to sleep. It is the custom of savage tribes to go to sleep during the twilight that follows the setting of the sun. It is well known that chickens will roost and go to sleep at any time of the day or night when the illumination of their quarters is gradually reduced.

It is the custom now in many rural sections of the world, where electric lights or other means of inexpensive artificial illumination are not had, to respond to the natural sleep inducing effect of twilight, and to go to bed and to sleep at that time of day. Previous to the past two generations, it was the regular custom of practically all people in their regular routine of living, to relax and go to sleep in response to the diminishing illumination of the setting sun and the twilight following.

Looking back to our ancestors of a thousand generations ago, the anthropologists report that it has been the general custom of all ages for our ancestors to respond to the sleep inducing effect of nature's twilight by going to bed and going to sleep. From these past generations of ancestors we inherit a nervous system that will respond to a gradual reduction of illumination with relaxation and the urge to go to sleep. On summer vacations when we sit quietly watching a sunset fade into twilight, we feel our hereditary instincts deep rooted in our nervous systems respond to the soporific effect of the gradual reduction of illumination.

Our present civilization has practically eliminated gradual reductions of illumination from our experience. In large cities, artificial illumination is in continuous use both night and day and where the sun supplies sufficient illumination during the day, electric lights are turned on at the first reduction of clear visibility.

Insomnia is a widespread condition that has increased in proportion to the increased modern use of electric lights. It is encouraged by, if not caused by, the elimination of the sunset as the natural soporific. Many people find that their nervous systems will not readily respond to sudden darkness as a soporific and thus they have difficulty in going to sleep except through the inducement of physical exhaustion, mental exhaustion or a soporific drug.

The use of soporific drugs has become widespread to such an alarming extent that most States have legislation against the sale of them except by the prescription of a physician. The greatest need and sale of such drugs is in the large cities where the soporific effect of the setting sun is not experienced. People with nervous systems that have been deprived of the opportunity to respond to the soporific effect of gradually reduced illumination, are in need of a means of producing gradually reduced illumination for inducing sleep. They need an artificial twilight at bedtime.

It has been found that persons suffering from insomnia require a longer and more gradual light reduction period to induce relaxation in their nervous systems than people who are conditioned by habitual response to the soporific effect of slowly reduced illumination.

This invention contemplates the method of inducing sleep through a normal and natural response to the gradual and automatic reduction of the light intensity of a source of illumination. This invention includes an automatic electrical mechanism, as a part of a bedroom lamp, which will gradually reduce the light intensity to darkness when an electrical switch is moved to the "off" position. A manually controlled adjustment is provided to regulate the time interval of dim out.

This invention includes also the method of shortening the time required to go to sleep whereby a gradual automatic reduction in illumination is used for inducing sleep and is gradually reduced in dim out interval on successive periods of use. Thus, as the user's nervous system gains by practice, a quicker response to the soporific effect of fading illumination, the time required to go to sleep is reduced.

As an example, a user starts by setting the light decreasing means to extinguish his bedroom light in one-half hour. On the second night he remembers that the bedroom became completely dark before he fell asleep the night before, so he does not decrease the dim out time of the light. On the third night he remembers sufficient light to distinguish a certain picture on the wall as his last memory that night so he adjusts the dimming means to extinguish the light in twenty-five minutes instead of thirty minutes. In a few more nights the user's nerves are more accustomed to relaxing under the influence of the artificial twilight and he falls asleep before twenty-five minutes. The next night he sets the light to extinguish in twenty minutes. Soon he is able to reduce the extinguishing time to fifteen minutes and his nerves respond so well to this natural soporific that he does not remain awake long enough to see complete darkness in his bedroom.

Sudden darkness as is customarily experienced before going to bed is a stimulant and not a sedative. In the case of small children, it is often terrorizing. Nature has not designed the nervous systems of human beings to take the sudden darkness without a shock of excitement. In children, a resistance to shock or fear at sudden darkness is developed as they grow older, but they can never respond to the sudden extinguishing of a light with the relaxing response induced by gradual reduction of light intensity until darkness is reached.

Children have nervous systems fresh with nature's instinctive reactions in prime condition. They respond readily to a relatively quick illumination fade-out. The use in their bedrooms of means to gradually reduce the illumination to darkness is a certain and excellent way to put them to sleep quickly and quietly.

The sudden extinguishing of the light in the bedroom of adults before they go to sleep will often stimulate a mental review of the thoughts, experiences and problems of the day. The sudden quenching of the light stops the eyes from holding mental attention, and frees the mind to turn actively to its own mental pictures and problems in an effort to study them. This process often fades into disturbing dreams, but never into sound sleep.

Nature's means of inducing sleep by twilight encourages the arrest of mental activity by the eyes preempting attention and holding it on still objects slowly fading in shadowy changes into the release of darkness. As the shadows fall the mind gradually relaxes its stubborn effort to cling to unsolved problems of the day. In accordance with my method, sleep comes to a relaxed mind and this sleep is sound.

This invention includes a machine for inducing sleep. More specifically, this machine is a device driven by an electric motor, for gradually extinguishing an electric light. Manually adjustable means for setting the fade-out time interval is provided.

The above and other objects and advantages of the invention will more fully appear from the following description made in connection with the accompanying drawings, wherein like reference characters refer to the same parts throughout the views, and, in which.

Figure 1:
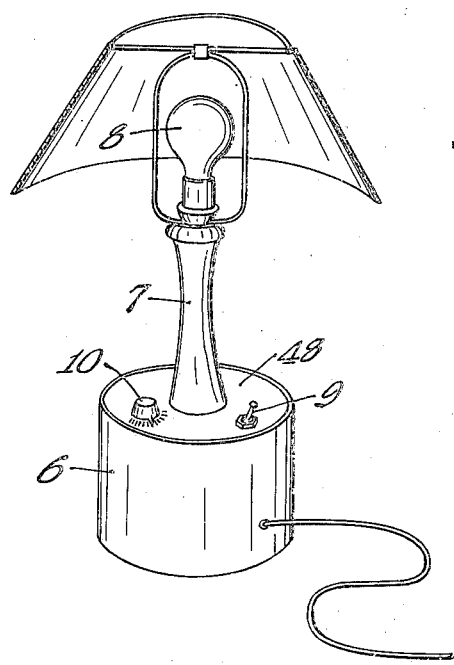
Figure 1 is a perspective view partially in section of a lamp unit embodying my invention.

In Figure 1 there is shown a lamp including a base 6 having a vertical standard 7 extending upwardly therefrom to support an incandescent lamp bulb 8. Mounted in the top of the base 6 is a switch unit 9 and a rheostat knob 10.

Figure 3:
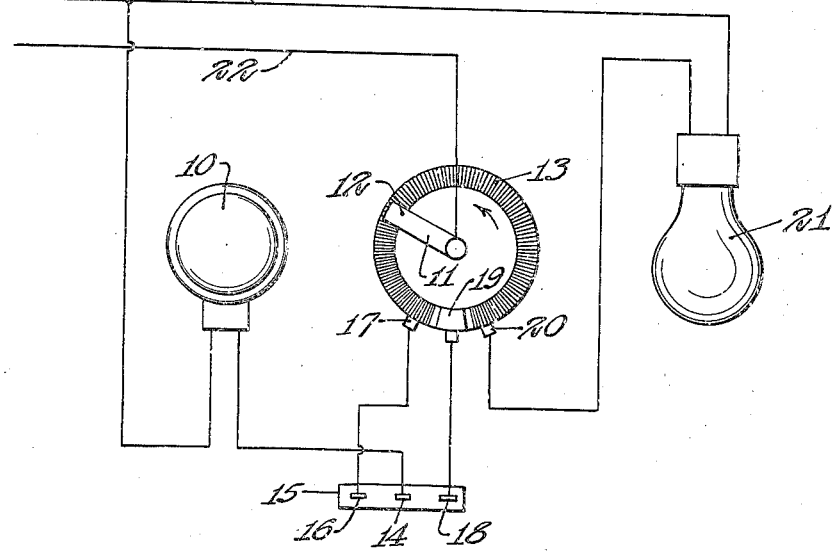
Figure 3 is a more or less diagrammatic view of a simple form of control circuit.

In Figure 3 there is shown a synchronous motor 10 which is adapted to be drivingly connected to a rheostat shaft 11 having an arm 12 which is movable along an arcuate resistance 13. The synchronous motor 10 is connected to one side 11 of a source of electrical power and the other side of the motor 10 is connected to the center pole 14 of a single pole double throw switch 15. The switch has a left hand pole 16 which is connected to a contact post 17 at one end of the resistance coil 13. The right hand pole 18 of the switch 15 is connected to a contact 19 which is electrically insulated from the adjacent ends of the resistance 13. The opposite end of the resistance 13 from its connection 17 is provided with a contact post 20 which is connected to one side of an electric lamp 21. The other side of the lamp 21 is connected to the power line 11 and the power line 22 is connected directly to the resistance or rheostat arm 12.

When the switch 15 is thrown to bridge contacts 14 and 16 the motor 10 will operate and in turn rotate the rheostat arm 12 until said arm leaves the resistance 13 and reaches the contact 19. When this happens the motor 10 will stop and the lamp 21 will be extinguished. When the switch 15 is placed in what may be termed the "on" position bridging contacts 14 and 18 with the arm 12 on the contact 19 as just described, the lamp 21 will not be energized immediately but the motor 10 will operate and cause the rheostat arm 12 to move from the contact 19 to the right hand side of the resistance 13. The lamp 21 will then be lit, and since the rheostat arm 12 has then left the contact 19 it will break the circuit to the motor 10 causing the lamp 21 to remain lighted.

In the arrangement in Figure 3 it is possible to vary the lamp dim out period by the selective use of lamps of different wattage. If a 400 ohm rheostat is used different dim out intervals may be obtained by use, for example, of lamps of 40, 50, 60 and 75 watts capacity. If the motor completes one rheostat cycle in twenty-five minutes, then the 40 watt lamp will provide a full twenty-five minute dim out period with a low light showing at the time the rheostat arm 12 leaves the resistance 13 and breaks the circuit to the lamp with the switch contacts 14 and 16 connected and the switch in what may be called its "off" position. The use of a 50 watt lamp will produce a practical black-out at the end of twenty-five minutes, a 60 watt lamp will produce darkness in approximately twenty minutes and a 75 watt lamp will be extinguished in approximately fifteen minutes. Thus the arrangement in Figure 3 provides a simple automatic lamp dim out device wherein a single pole switch can be used and dim out intervals selection can be made without the use of an additional rheostat.

Figure 4:
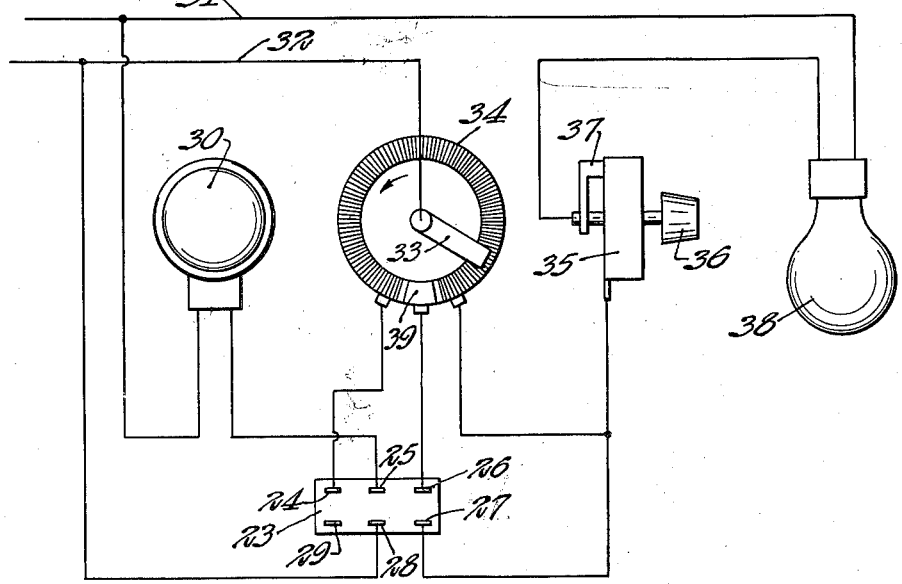
Figure 4 is a more or less diagrammatic view showing a constant speed synchronous motor and a rheostat for manually adjusting the dim out interval.

In Figure 4 there is shown a double pole double throw switch 23 having contacts 24, 25, 26, 27, 28 and 29. In this embodiment the motor 30 is connected to the power line 31 and also to the switch contact 25. Switch contact 28 is connected to the other power line 32. The power line 32 is also connected to a rotary rheostat arm 33. The rheostat resistance 34 has one side thereof connected to the switch contact 24 and the other side of the rheostat resistance 34 is connected to a variable resistance unit 35 having a control knob 36 for shifting its contact arm 37. In the well known "Omite" rheostat shown the arm 33 comes in direct contact with the bare side of the coil of resistance wire which provides the electrical resistance of the rheostat.

The switch contact 27 is also connected to the variable resistance 35, and said resistance unit is in turn connected to one side of a lamp 38 whose other side is connected to the power line 31. The switch contact 29 is not used. If the switch 23 is thrown to the right a circuit will be established which connects contacts 25 and 26 and also connects contacts 27 and 28. This is the "on" position of the switch 23. If the rheostat arm 33 is on the contact 39 which is connected with the switch contact 26 the lamp 38 will be illuminated and the motor 30 will operate until the rheostat arm 33 leaves the contact 39 and is engaged only with the resistance 34. Thereupon the motor 30 will stop, the rheostat arm 33 will cease movement and the lamp 38 will continue to burn. If the switch 23 is thrown to the left to its "off" position the motor 30 will operate to rotate the rheostat arm 33 gradually dimming the light 38. The dimming interval in this case is controlled by desired setting of the variable resistance 35 so that the lamp 38 will be extinguished after any desired degree of movement of the rheostat arm 33 about the resistance 34. If the lamp is extinguished before the arm 33 reaches the left hand side of the resistance 34 the motor 30 will continue to operate until the arm 33 leaves the resistance 34 and lies upon the contact 39 which is not connected in the circuit in this position of the switch 23.

Figure 5:
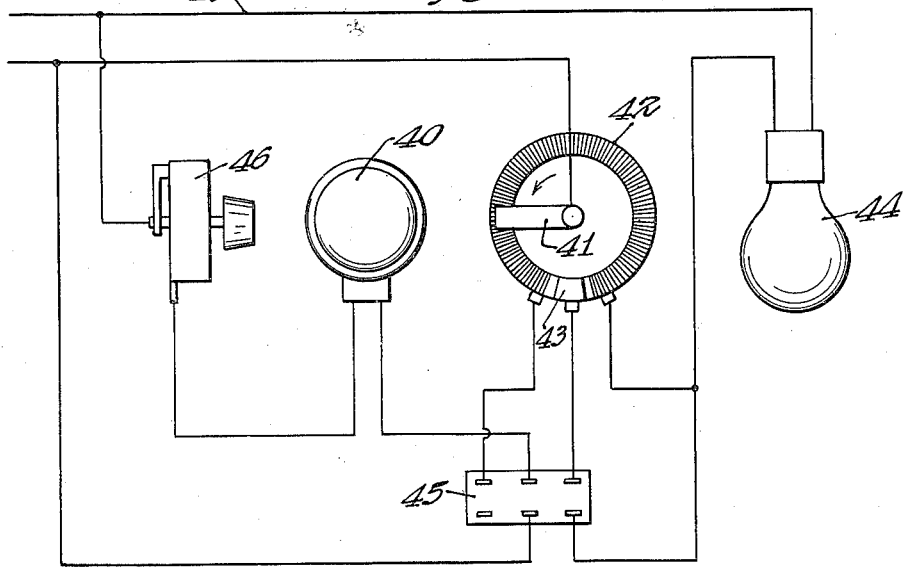
Figure 5 is a more or less diagrammatic view showing a variable speed motor and rheostat for affecting various time intervals of dim out.

In Figure 5 there is shown an arrangement of a motor 40 which is adapted to drive a rheostat arm 41 about a resistance 42 and there is also shown a contact element 43 similar to the contacts 39 and 19 in Figures 4 and 3 respectively. The lamp 44 is shown connected to the rheostat resistance 42 and a double pole double throw switch 45. This switch is connected in the same manner as the switch 23 shown in Figure 4.

The difference between the arrangement of Figures 4 and 5 is that in Figure 5 a hand operated variable resistance 42 is interposed in the line connecting one side of the motor 40 with a power line 47. The resistance 46 is adapted to variably control the speed of the motor 40 whereas in Figure 4 the speed of the motor 30 is constant. By varying the speed of the motor 40 it is, of course, possible to vary the speed of movement of the rheostat arm 41 and, consequently, to change the interval of dim out of the lamp 44 as the rheostat arm 41 moves about its resistance 42. Swinging of the arm of switch 45 to the right will produce an "on" switch position in the same manner as in Figure 4, and throwing of the switch 45 to the left will actuate the motor for achieving a dim out of any desired interval as in Figure 4.

Figure 2:
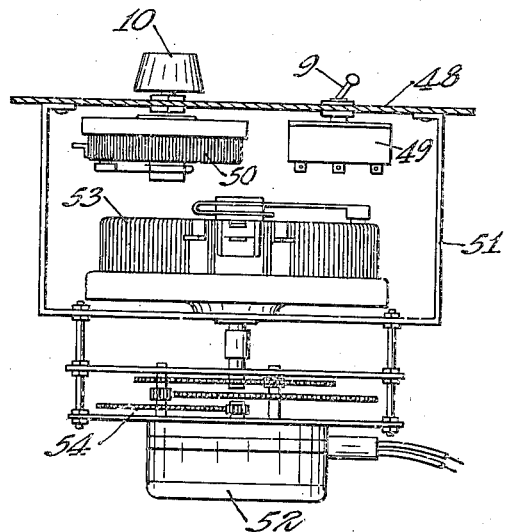
Figure 2 is a side elevation of the control unit as it might be arranged in a lamp base.

Figure 2 is illustrative of an assembly which can be incorporated in the lamp base 6 shown in Figure 1 and Figure 2 includes elements which can be adapted to the diagrams of Figure 4 or Figure 5. There is a plate or panel 48 which is also shown in Figure 1. Upon this panel is mounted a switch 49 corresponding to switches 23 and 45 in Figures 4 and 5 which is operated by the lever 9 shown also in Figure 1. The knob 10 is adapted to operate a resistance unit 50 which may be used in the same manner as either the resistance 35 of Figure 4 or resistance 46 of Figure 5. A generally U-shaped support 51 is secured to the panel 48 and extends downwardly therefrom to support a motor 52 corresponding to motor 30 and 40 of Figures 4 and 5. The motor 52 is adapted to drive a variable resistance unit 53 through the medium of a gear train 54, the resistance 53 being similar to resistance 34 and 42 in Figures 4 and 5. In Figure 2 the wiring has been eliminated in view of the fact that it can be used as shown in either Figures 4 and 5.

This invention makes it obvious that many different means may be used for inducing sleep by an automatic reduction of illumination, and various changes may be made in the form, details, arrangements and proportions of the various parts without departing from the scope of my invention.

What I claim is:

1. A dimming lamp including an electrical circuit adapted for connection with a source of electrical energy, a timing motor and a lamp electrically connected in said circuit, a variable resistance in said circuit adapted for connection directly to the source and interposed between said motor and the source and said lamp and the source, a switch in the circuit actuated by said motor, a manually operable switch in said circuit interconnected with said resistance, said motor, said lamp and said motor driven switch for controlling said lamp for either continuous illumination or a progressive reduction of illumination until said lamp is extinguished.

2. A dimming lamp including an electrical circuit adapted for connection with a source of electrical energy, a timing motor and an electrical lamp connected in the circuit in parallel with each other, a variable resistance in said circuit adapted for connection directly to the source and interposed between said motor and the source and said lamp and the source, and interconnected motor driven switching means and manual switching means to control current flow to the lamp for either continuous illumination or the progressive dimming of the lamp to extinguishment.

3. A dimming lamp including an electrical circuit adapted for connection with a source of electrical energy, a timing motor and an electric lamp connected in the circuit in parallel with each other, a variable resistance in the circuit between the lamp and the source and between the motor and the source, said resistance having electrical connection with both said motor and said lamp and being adapted for direct connection with the source of electrical energy, a motor operated switch in the circuit, a two-position manually operable switch in said circuit connected between said resistance and said motor and between said resistance and said lamp and to said motor operated switch for controlling current flow to said motor to the lamp in one position to vary the flow of current from said resistance to said lamp, to effect gradual decrease in the current flow to gradually decrease and extinguish the illumination and in the other position, to allow constant current flow for continuous illumination of said lamp.

ALLEN TRASK.

REFERENCES CITED

The following references are of record in the file of this patent:

UNITED STATES PATENTS

| Number | Name | Date |
|--------|------|------|
| 745,488 | Goltz | Dec. 1, 1903 |
| 1,028,360 | Kastner | June 4, 1912 |
| 1,964,846 | Earnshaw | July 3, 1934 |
| 2,180,047 | Griffin | Nov. 14, 1939 |

FOREIGN PATENTS

| Number | Country | Date |
|--------|---------|------|
| 62,431 | Sweden | Nov. 11, 1924 |
| 411,349 | Great Britain | June 7, 1934 |